(12) United States Patent
Claybon

(10) Patent No.: US 11,996,999 B2
(45) Date of Patent: *May 28, 2024

(54) SYSTEM AND METHOD FOR TESTING AND/OR MONITORING BROADBAND INTERNET CONNECTIVITY

(71) Applicant: Speedpact Inc., Brooklyn, NY (US)

(72) Inventor: Arthur Claybon, Brooklyn, NY (US)

(73) Assignee: Speedpact Inc., Brooklin, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/578,285

(22) Filed: Jan. 18, 2022

(65) Prior Publication Data
US 2022/0141114 A1 May 5, 2022

Related U.S. Application Data

(63) Continuation of application No. 16/178,221, filed on Nov. 1, 2018, now Pat. No. 11,258,690.

(60) Provisional application No. 62/627,429, filed on Feb. 7, 2018, provisional application No. 62/580,659, filed on Nov. 2, 2017.

(51) Int. Cl.
| | |
|---|---|
| *H04W 24/00* | (2009.01) |
| *H04L 43/04* | (2022.01) |
| *H04L 43/0888* | (2022.01) |
| *H04L 43/50* | (2022.01) |
| *H04W 24/08* | (2009.01) |
| *H04W 24/10* | (2009.01) |

(52) U.S. Cl.
CPC .......... *H04L 43/0888* (2013.01); *H04L 43/04* (2013.01); *H04W 24/08* (2013.01); *H04W 24/10* (2013.01)

(58) Field of Classification Search
CPC . H04L 43/0888; H04L 43/04; H04L 43/0811; H04L 43/10; H04L 43/12; H04L 43/50; H04W 24/08; H04W 24/10
USPC ........................................................ 370/252
See application file for complete search history.

(56) References Cited

U.S. PATENT DOCUMENTS 11,258,690 B1 * 2/2022 Claybon ............. H04L 43/0811
2015/0333999 A1 * 11/2015 Mordani ................. H04L 65/61
709/224

OTHER PUBLICATIONS

Comparison of AT-Tester with Other Popular Testers for Quality of Service Experience (QoSE) of an Internet Connection, Aug. 2009) (Year: 2009).*
Ano et al. ( A TCP Throughput Comparison Method for Multi-homing Internet Customers, 2003) (Year: 2003).*

* cited by examiner

Primary Examiner — Maharishi V Khirodhar

(57) ABSTRACT

A system and a method for testing broadband internet connectivity are disclosed. The system contains a monitoring device electrically connected with a router, at least one remote server configured to communicate with the monitoring device through the router, wherein the monitoring device is configured to run one or more tests to determine one or more parameters of the internet connection between the monitoring device and the at least one remote server.

11 Claims, 7 Drawing Sheets

|        | Avg. throughput (control) | Avg. throughput (popular) |
|--------|---------------------------|---------------------------|
| ISP 1  | x1 Mbps                   | x2 Mbps                   |
| ISP 2  | y1 Mbps                   | y2 Mbps                   |
| ISP n  | z1 Mbps                   | z2 Mbps                   |

SYSTEM AND METHOD FOR TESTING AND/OR MONITORING BROADBAND INTERNET CONNECTIVITY

CROSS REFERENCE TO RELATED APPLICATIONS

This application claims the benefit of U.S. Provisional Application No. 62/580,659, filed on Nov. 2, 2017, which is incorporated herein by reference in its entirety. This application claims the benefit of U.S. Provisional Application No. 62/627,429, filed on Feb. 7, 2018, which is incorporated herein by reference in its entirety. This application is a continuation of U.S. patent application Ser. No. 16/178,221 titled "A SYSTEM AND METHOD FOR TESTING AND/OR MONITORING BROADBAND INTERNET CONNECTIVITY" filed Nov. 1, 2018, now issued U.S. Pat. No. 11,258,690, which is incorporated herein by reference in its entirety.

FIELD

The present invention relates to Broadband Internet connectivity. More particularly, the present invention relates to a system and method for testing and/or monitoring Broadband Internet connectivity.

BACKGROUND

Globally there are more devices that communicate over the Internet (over 8 billion) than there are people (7.5 billion world population). Additionally, this trend is forecast to accelerate as the Internet of Things (IoT) becomes a reality worldwide (almost 500 million devices were added in 2016 alone).

While Original Equipment Manufacturers (OEMs) have managed to produce an ever increasing number of devices that communicate wirelessly, two trends have emerged: 1) similar to the maturation of technology in the automobile industry—consumers' ability to debug issues with their home networks has not kept pace with technology advances, and 2) within consumer's homes, there is a growing body of evidence that suggests that Internet Service Providers (ISPs the firms responsible for signing up customers and providing them with Internet in their homes) have also struggled to maintain the reliable, consistent Internet speeds that were promised in consumer contracts.

The result is a growing frustration from consumers for what is seen as "bad" or "spotty" home Internet and a distinct inability to diagnose and/or solve these issues without significant guidance. What's worse, consumers will most likely not get this guidance from the ISPs themselves, whose agents: 1) are minimally trained, 2) have limited ability to remotely diagnose issues in consumers' homes outside of checking "line" issues, and 3) are not incentivized to help (if the ISP is at fault, they would have broken their own contract).

A study conducted by Cisco in 2015 reported that 40%+ of broadband users experience Internet issues monthly, over a quarter of broadband users have had a technician come out to try to "fix" their Internet issues, and, for those who've had a technician visit, 70%+ of the time the technician is unable to find the problem (it either goes away on its own or doesn't). Furthermore, the study suggests that as the number of wireless devices connected in our home continues to rise, so will these issues.

There are three major reasons why consumers experience "bad" Internet: 1) the consumer's ISP is experiencing an issue (i.e. the Internet coming into consumer's home is actually "bad"), 2) the consumer's router or consumer's Wi-Fi is experiencing an issue (i.e. consumer is too far away from the router, the "channel" the consumer is using is congested, etc.), or 3) user error (i.e. consumer configured something incorrectly, consumer's computer is too old, etc.). It's difficult to determine which issue is more prevalent because, as previously mentioned, most of the time these issues go undiagnosed. But a common heuristic from professional IT engineers suggests that ISP issues are at fault at least an equal percentage of the time (i.e. at least one third of the time the consumer's Internet actually did go "down").

That said, it is very difficult for the typical household to diagnose issues with Internet connectivity because networking concepts and techniques are well beyond most consumer's technical capacity. Additionally, while test software is abundant, almost all consumers lack the requisite hardware to monitor and diagnose issues with their broadband connectivity. This lack of specialized hardware is ultimately the biggest barrier as even a technically savvy user wouldn't necessarily know enough about their say lap-top or desktop computer configuration to enable them to conduct meaningful Internet connectivity tests using these devices.

In view of the limitations listed above, a need exists for an improved device and/or method for testing and/or monitoring Broadband Internet connectivity.

Figure 1:
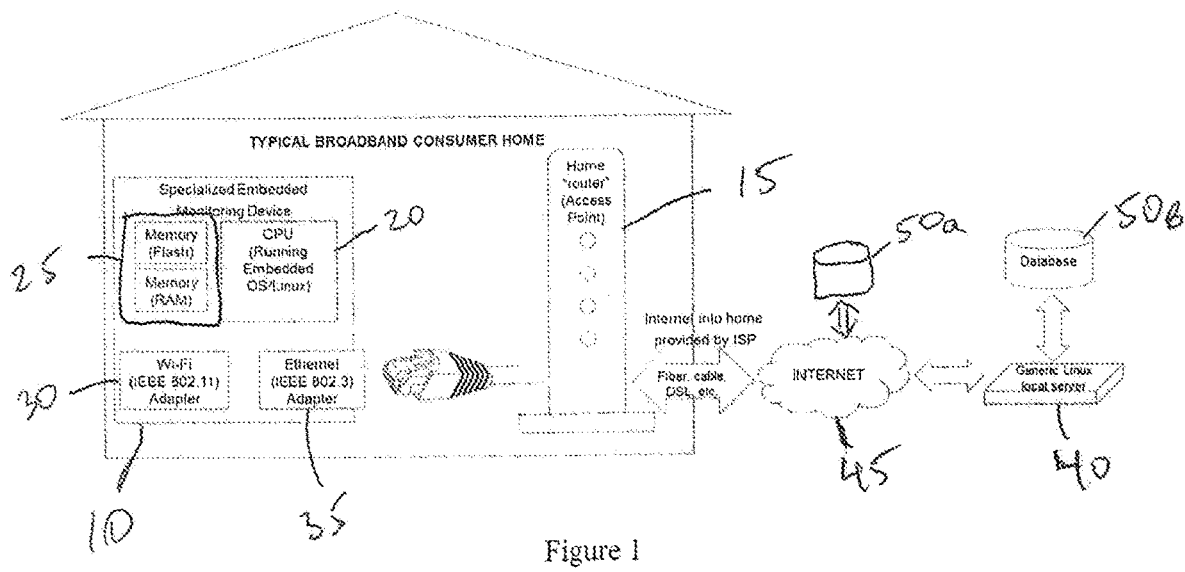
FIG. 1 depicts a system according to the present disclosure.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Also, it is to be understood that the phraseology and terminology used herein is for the purpose of description and should not be regarded as limiting. The use of "including,"

"comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Systems and/or methods according to some embodiments presently disclosed are to test, monitor and/or diagnose issues with home broadband Internet with some focus, for example, on: 1) the ISP itself, and 2) the consumer's home router and/or wireless network connection (for example Wi-Fi). According to some embodiments, a method presently disclosed is "arm's length", i.e. totally secure, transparent to the user, and doesn't require monitoring user's actual Internet traffic (doesn't look into "their" data, require them to give out their passwords, etc.).

According to some embodiments, a system for testing internet connectivity according to the present application comprises a monitoring device 10. According to some embodiments, the monitoring device 10 presently disclosed is electrically connected with the consumer's home "router" (access point) 15 via, for example, the router 15's local area network (LAN) port. It is to be understood that the monitoring device 10 may be electrically connected with the router 15 through other ports as well. For example, USB port or any other port available on the router 15. According to some embodiments, the router 15 views the monitoring device 10 as just another client that is coupled with the home LAN (Local Area Network), similar to consumer's laptops, mobile phones, TVs, etc. And just like these devices, the monitoring device 10 may communicate to other devices on a network (i.e. internet) 45 via the router 15.

According to some embodiments, the monitoring device 10 (shown in FIG. 1) comprises one or more Central Processing Unit (CPU) 20, a memory 25, a radio frequency (RF) circuitry 30, and a wired network controller 35. The one or more CPU 20 run or execute various software programs and/or sets of instructions stored in the memory 25 to perform various functions for the monitoring device 10 and to process data.

According to some embodiments, the monitoring device 10 is a standalone device. According to some embodiments, the monitoring device 10 is embedded in the router 15. According to some embodiments, the router 15 performs the function of the monitoring device 10 described below. According to some embodiments, the monitoring device 10 is embedded in another device, for example, computer and/or laptop.

According to some embodiments, the monitoring device 10 comprises specialized circuity (i.e. CPU) programmed to function according to some embodiments presently disclosed via its firmware. According to some embodiments, the specialized circuity (i.e. CPU) is embedded in another device comprising operating system, memory, and/or database to store results. According to some embodiments, the operating system used in the monitoring device 10 and/or the another device is OpenWrt® comprising toolset BusyBox®. According to some embodiments, the specialized circuity (i.e. CPU) is embedded in another device comprising one or more parts shown in FIG. 4 and described below.

More information on the OpenWrt®, an operating system for embedded devices, can be found in "Embedded Operating Systems: A Practical Approach" by Alan Holt, Chi-Yu Huang, which is incorporated herein by reference in its entirety.

More information on the BusyBox®, a set of Unix tools (including networking tools) for embedded devices and a requisite part of OpenWrt®, can be found in "Embedded Linux Primer: A Practical, Real-World Approach by Christopher Hallinan, which is incorporated herein by reference in its entirety.

According to some embodiments, the memory 25 may comprise high-speed random access memory and/or non-volatile memory, such as one or more magnetic disk storage devices, flash memory devices, or other non-volatile solid-state memory devices. Access to memory 25 by other components of the monitoring device 10, such as the CPU 20 may be controlled by a memory controller (not shown). The CPU 20, and the memory controller (not shown) may be implemented on a single chip. In some other embodiments, they may be implemented on separate chips.

According to some embodiments, the RF circuitry 30 may be configured to receive and transmit RF signals, also called electromagnetic signals. The RF circuitry 30 converts electrical signals to/from electromagnetic signals and communicates with communications networks and other communications devices via the electromagnetic signals. The RF circuitry 30 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 30 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

According to some embodiments, the monitoring device 10 is configured to transmit data (i.e. information and/or diagnostics) through the users own network via the users access point/route 15. According to some embodiments, the monitoring device 10 is configured to transmit data (i.e. information and/or diagnostics) directly to the user's phone via Wi-Fi, Bluetooth, or cellular network.

The monitoring device 10 may further comprise a power system (not shown) for powering the various components. The power system may comprise a power management system, one or more power sources (e.g., battery, alternating current (AC)), a recharging system, a power failure detection circuit, a power converter or inverter, a power status indicator (e.g., a light-emitting diode (LED)) and/or any other components associated with the generation, management and distribution of power in the monitoring device 10.

According to some embodiments, one or more remote servers 40 may be used to communicate with the monitoring device 10 through the network 45. According to some embodiments, the one or more remote servers 40 may communicate with one or more databases 50a-b. According to some embodiments, the one or more remote servers 40 may communicate with the database 50a through the network 45. According to some embodiments, the one or more remote servers 40 may be electrically connected with the database 50b. According to some embodiments, the one or more databases 50a-b allow the one or more remote servers 40 to store and/or retrieve monitoring/diagnostic results from the monitoring devices 10.

According to some embodiments, the monitoring device 10 will begin monitoring Internet connection by conducting one or more tests once electrically connected with the router 15. According to some embodiments, the one or more tests may be conducted periodically throughout the day. According to some embodiments, the one or more tests may be conducted at a prescheduled time(s) throughout the day. According to some embodiments, the one or more tests may be triggered by an autonomous event or by the user. The one or more tests may be professional networking utility applications (i.e. software). The one or more tests are described in more detail in "Fundamentals of Communications and Networking" by Michael G. Solomon, David Kim, Jeffrey L. Carrell, which is incorporated herein by reference in its entirety. The one or more tests are also described in more detail in "Network Performance Open Source Toolkit: Using Netperf, tcptrace, NISTnet" by Richard Blum, which is incorporated herein by reference in its entirety. The one or more tests are also described in more detail in "Linux Kernel Networking: Implementation and Theory" by Rami Rosen, which is incorporated herein by reference in its entirety.

According to some embodiments, the one or more test may be used to determine: 1) is the Internet connection as provided by the ISP "up" (e.g. "ping" test), 2) is the Internet connection as provided by the ISP capable of receiving/transmitting data, and/or 3) is the speed/throughput of the Internet connection as provided by the ISP as promised.

According to some embodiments, testing if the Internet connection as provided by the ISP is "up" may be accomplished by sending Internet Control Message Protocol (ICMP) Echo Request packets to the one or more remote servers 40 and waiting for the ICMP Echo Reply. The monitoring device 10 may store the time it took to receive the Echo Reply or an error if no Reply is received because the connection is down in the memory 25.

According to some embodiments, testing if the Internet connection is capable of receiving/transmitting data and/or if the speed/throughput of the Internet connection is provided as promised by ISP may be accomplished using a network monitoring application with client and server functionality that produces performance measurement calculations as described below.

According to some embodiments, the network monitoring application operates in "server" mode on the one or more remote servers 40. In server mode the network monitoring application "listens" for a signal from the monitoring device 10 running in "client" mode. When the one or more remote servers 40 receives the proper signal from the monitoring device 10, the one or more remote servers 40 transmit data to the monitoring device 10 over a period of time (the amount of data or period of time may be pre-programmed). The monitoring device 10 operating in client mode, measures the amount of time it takes to receive the data. For example, one such measurement: 105.4719 MB received, divided by the 10.09 seconds it took to receive the data=87.7015 Mbps. This measurement, typically in Mega-Bits Per Second (Mbps), is the "speed" or "throughput" of the connection. This is also the basis of the contract that consumers maintain with their ISPs (Plan A: "Fast" 100 Mbps speed, Plan B: "Faster" 300 Mbps, Plan C: "Blazing" 750 Mbps, etc.). The monitoring device 10 may store the results of the test (or an error if no results are received presumably because the Internet connection is non-functional) in the memory 25 and/or in the one or more databases 50a-b.

According to some embodiments, the firmware of the monitoring device 10 may be programmed to conduct several tests at periodic times throughout the day to monitor the consumer's wireless internet connection, including: 1) is the router sending out a wireless signal, 2) if so, what is the quality of the signal going out vs. expected quality, 3) the signal quality of competing devices, 4) what is the channel that the consumer's router is using, 5) the channels of competing devices.

According to some embodiments, testing of the consumer's wireless environment may be accomplished by having the monitoring device 10 periodically turn the RF circuitry 30 "on" and "scan" the wireless environment. According to some embodiments, the "scan" may grab information from all the devices it "hears" including their names, channels (specific frequency band at which their broadcasting), and signal strength/quality. The monitoring device 10 may store this information in the memory 25 and/or in the one or more databases 50a-b and then turn the RF circuitry 30 "off".

According to some embodiments, the firmware of the monitoring device 10 may be programmed to check the power of the user's wireless signal (i.e. Wi-Fi). According to some embodiments, the monitoring device 10 is configured to run a Wi-Fi test using iwinfo. More information on tools and metrics for Wi-Fi testing in Linux can be found in "Linux Unwired", by Roger Weeks, Edd Dumbill, Brian Jepson, which is incorporated herein by reference in its entirety. More information on Wi-Fi testing can be found in "802.11 Wireless Networks: The Definitive Guide: The Definitive Guide", by Matthew S. Gast, which is incorporated herein by reference in its entirety.

It is to be understood that other Internet connection tests may be preformed by the monitoring device 10. It is to be also understood that above described test(s) or any other tests may be provided to the monitoring device 10 through the network 45.

According to some embodiments, the monitoring device 10 stores diagnostic and monitoring information in the memory 25. According to some embodiments, the monitoring device 10 transmits diagnostic and monitoring information via the consumer's router 15 to the one or more remote servers 40 where the data is stored in the one or more databases 50a-b. According to some embodiments, the monitoring device 10 transmits and stores diagnostic and monitoring information via the consumer's router 15 to the one or more databases 50a-b.

Figure 2:
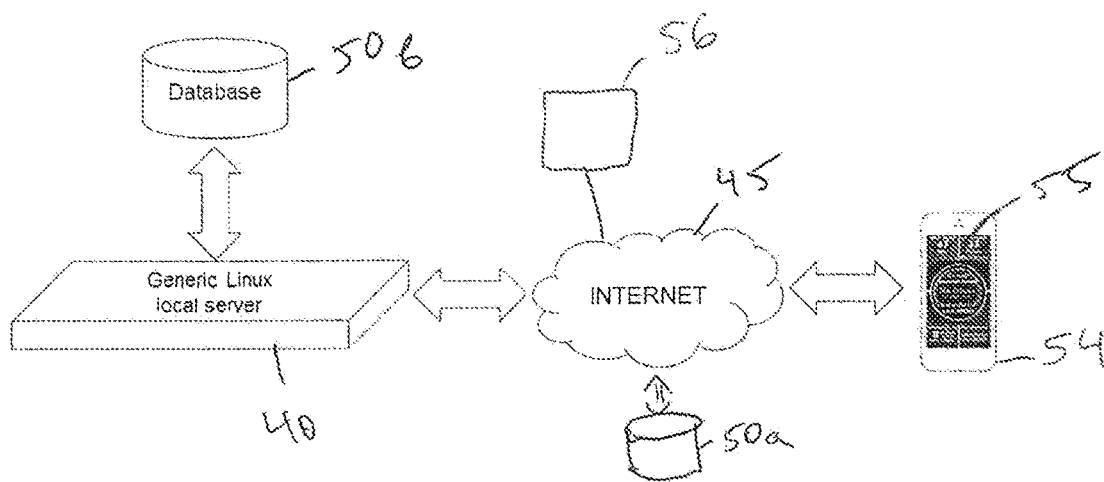
FIG. 2 depicts a mobile application communicating with the system according to the present disclosure.

According to some embodiments, consumers are able to access their diagnostic and monitoring information by registering and using a web browser running on a computer 56 According to some embodiments, consumers are able to access their diagnostic and monitoring information by registering and using a web browser running on a portable device 54 through the network 45. The portable device 54 may be a cellular phone, a tablet, or any other portable computer device. According to some embodiments, consumers are able to access their diagnostic and monitoring information by registering and using a web or mobile application ("app") 55 shown in FIG. 2. The web or mobile application ("app") 55 may run on the portable device 54 and/or computer 56.

According to some embodiments, the monitoring device 10 has a unique identification (ID) located on the physical package and/or stored in the device 10's memory 25, which can be used to establish ownership of the device 10. The unique ID, when input into the app, may link the consumer with the results of that monitoring device 10 (as stored in the memory 25 and/or stored in the one or more databases 50a-b under that unique ID) and allow the consumer access to their results going forward.

According to some embodiments, the app 55 may also gather additional information from the consumer (and consumer's wireless network) and store this in the one or more databases 50a-b to aid in broadband monitoring and diagnostics, such as: 1) consumer's location, 2) the Internet Service Provider's name, 3) promised speeds, 4) cost, 5) technology, 6) router OEM/model, 7) consumer's perceived satisfaction, 8) number of household members, 9) locale type (urban/rural/apartment/SFR), and/or 10) wireless speed (app may measure this directly).

The raw data from the monitoring device 10 along with information gathered from the consumer (and consumer's wireless network) may be analyzed to generate ISP statistics over time. The ISP statistics may include:
 1) Internet connection up-time,
 2) Internet connection speed vs. promised speed, and
 3) Internet connection value vs. downtime (how much does the ISP owe the consumer based on how much consumer pay vs. Internet reliability);

The raw data from the monitoring device 10 along with information gathered from the consumer (and consumer's wireless network) may be analyzed to generate ISP wireless. statistics over time. The ISP wireless statistics may include:
 1) proper "channel" setting (consumer should only use non-overlapping channels),
 2) signal quality (because the monitoring device 10 is positioned next to the router 15, the signal quality measurement will detect issues with the wireless router 15 itself, and
 3) wireless congestion (the server can analyze data regarding the wireless environment over time and recommend the best channel for the consumer).

According to some embodiments, at least some of the wi-fi information can be used to determine which wi-fi channel the user should be using for their specific environment at a specific time for 2G Wi-Fi networks. For 2G networks, users should avoid the overlapping channels, and instead choose either channel 1, 6, or 11, depending on which channel has the least amount of interference at the time.

According to some embodiments, the presently disclosed monitoring device 10 may be configured to use crowdsourcing to determine in real time when an ISP goes down or is experiencing issues in a certain area, and to notify users in real time when this occurs. According to some embodiments, the presently disclosed monitoring device 10 can also proactively notify the users when the ISPs network is back to normal.

Figure 3:
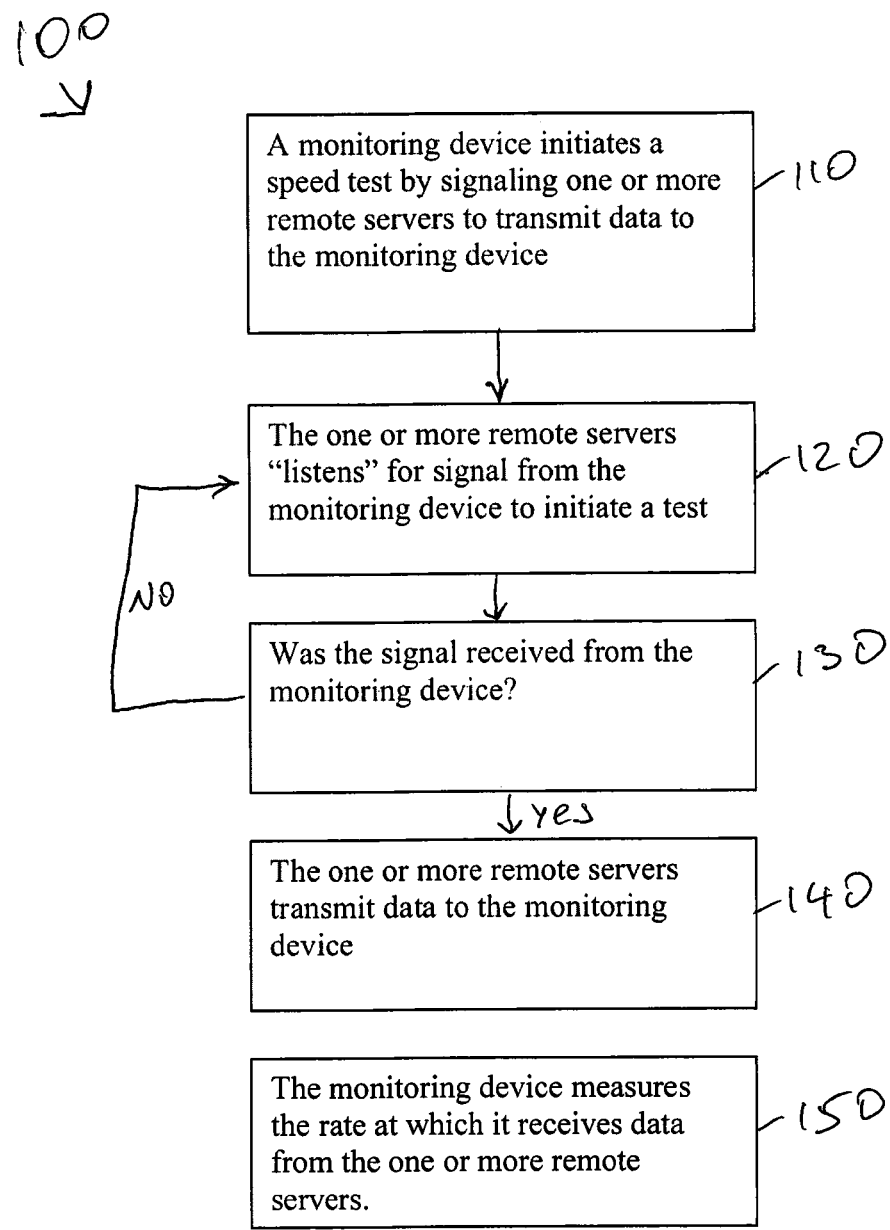
FIG. 3 depicts a method according to the present disclosure.

Referring to FIG. 3, a method 100 for testing Internet connection is shown according to the present disclosure. At 110, the monitoring device 10 initiates a speed test by signaling one or more remote servers 40 to transmit data to the monitoring device 10. At 120, the one or more remote servers 40 "listens" for signal from the monitoring device 10 to initiate a test. At 130, the one or more servers 40 determine if the signal was received from the monitoring device 10. If the signal was not received, the one or more remote servers 40 continue to wait for the signal from the monitoring device 10 at 120. If the signal is received, the one or more remote servers 40 transmit data to the monitoring device 10 at 140. At 150, the monitoring device 10 measures the rate at which it receives data from the one or more remote servers 40. The rate at which data is received may be stored in memory 25 and/or databases 50a-b.

According to some embodiments, presently disclosed device and method create a network of consumers who are able to much more accurately and competently monitor and diagnose many of the issues that affect home broadband networks. Additionally, because ISP issues tend to be "systemic" (experienced by multiple consumers in the same location at the same time) the system may be able to determine network outages/issues across a region. This may enable consumers or other interested parties who did not even have the monitoring device 10 to detect issues in their area that are caused by their ISP.

Figure 4:
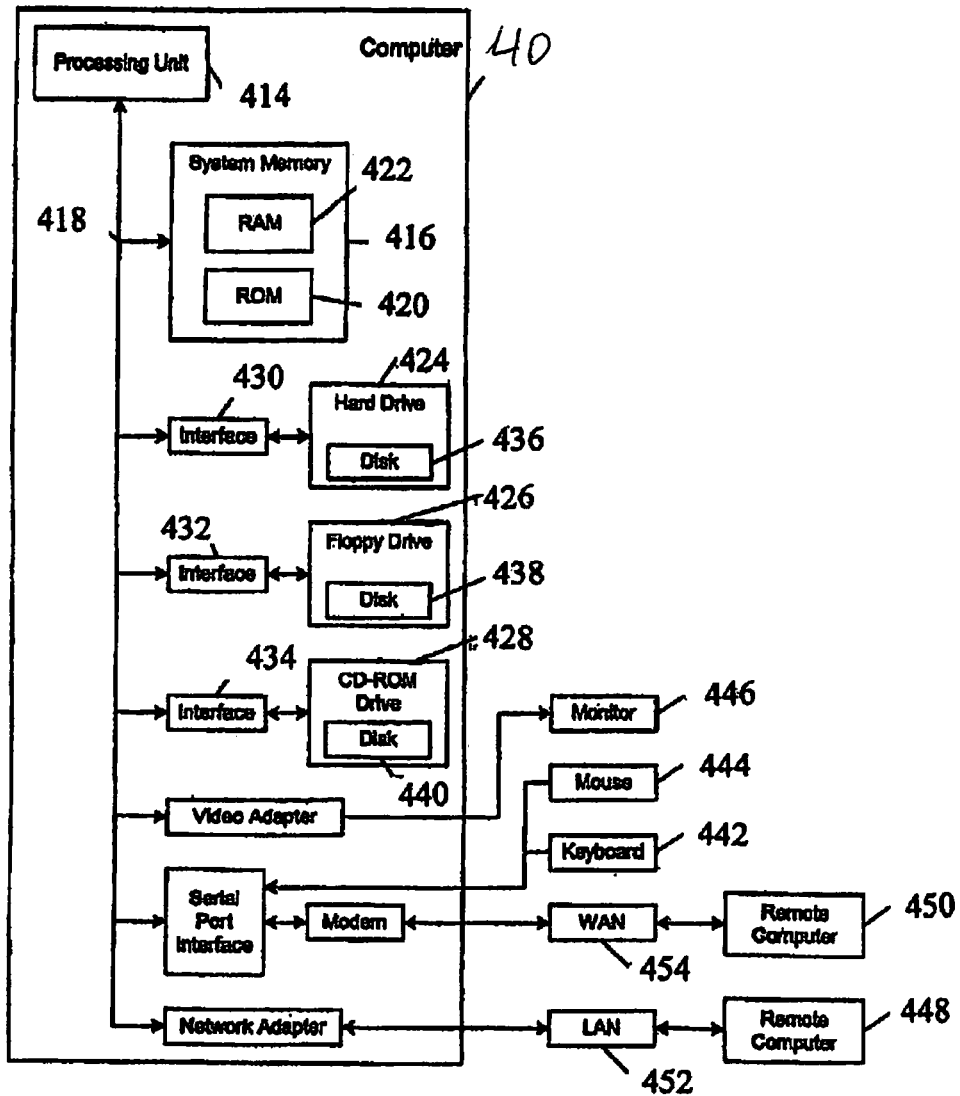
FIG. 4 depicts a block diagram according to the present disclosure.

Referring to FIG. 4, the remote server 40 and/or computer 56 are shown according to the present disclosure. The remote server 40 and/or computer 56 comprises a processing unit 414, a system memory 416, and a system bus 418 that couples processing unit 414 to the various components of remote server 40 and/or computer 56. Processing unit 414 may include one or more processors, each of which may be in the form of any one of various commercially available processors. System memory 416 includes a read only memory (ROM) 420 that stores a basic input/output system (BIOS) containing start-up routines for remote server 40 and/or computer 56, and a random access memory (RAM) 422. System bus 418 may be a memory bus, a peripheral bus or a local bus, and may be compatible with any of a variety of bus protocols, including PCI, VESA, Microchannel, ISA, and EISA. The remote server 40 and/or computer 56 may also comprise a hard drive 424, a floppy drive 426, and CD ROM drive 428 that are connected to system bus 418 by respective interfaces 430, 432, 434. Hard drive 424, floppy drive 426, and CD ROM drive 428 contain respective computer-readable media disks 436, 438, 440 that provide non-volatile or persistent storage for data, data structures and computer-executable instructions. Other computer-readable storage devices (e.g., magnetic tape drives, flash memory devices, and digital video disks) also may be used with the remote server 40 and/or computer 56. A user may interact (e.g., enter commands or data) with the remote server 40 and/or computer 56 using a keyboard 442 and a mouse 444. Other input devices (e.g., a microphone, joystick, or touch pad) also may be provided. Information may be displayed to the user on a monitor 446. The remote server 40 and/or computer 56 may also comprise peripheral output devices, such as speakers and a printer. One or more remote computers 448 may be connected to the remote server 40 and/or computer 56 over a local area network (LAN) 452, and one or more remote computers 450 may be connected to the remote server 40 and/or computer 56 over a wide area network (WAN) 454 (e.g., the Internet).

According to some embodiments, testing of the consumer's wireless environment may be accomplished without the monitoring device 10. A consumer without the monitoring device 10 may communicate with the remote server 40 using, for example, the web or mobile application ("app") 55. After determining consumer's location (i.e. home address, zip code, etc) and consumer's ISP (i.e. name of the ISP) the system presently disclosed may search data stored in the memories 25 and/or databases 50*a-b* of all other users/consumers in the same geographical area and have the same ISP. Based on the data collected from other users in the same geographical area with the same ISP, the system presently disclosed may provide Broadband Internet connectivity information to the consumer without the monitoring device 10.

Combining data from other users in the same geographical area with the same ISP provides a monitoring, testing, and/or diagnostic capability that adds confidence levels to diagnostics based on community level data.

According to some embodiments, presently disclosed system may be used to determine the best Broadband Internet connectivity provider in an area and to advise the consumer accordingly. Consumers interested in finding the best Broadband Internet connectivity provider in their area may communicate with the remote server 40 using, for example, the computer 56 and/or web or mobile application ("app") 55. After determining consumer's location (i.e. home address, zip code, etc) the system presently disclosed may search data stored in the memories 25 and/or databases 50*a-b* of all other users/consumers in the same geographical area. Based on the data collected from other users in the same geographical area, the system presently disclosed may determine the best Broadband Internet connectivity provider and may provide that information to the consumers.

Combining data from other users in the same geographical area provides a monitoring, testing, and diagnostic capability for determining the best Broadband Internet connectivity provider.

Net neutrality is, "the principle that Internet Service Providers should enable access to all content and applications regardless of the source, and without favoring or blocking particular products or websites."

According to some embodiments, a presently disclosed system may be used to test and/or verify net neutrality in the following manner. A sample of a community (certain geography, zip code, etc.) connect the monitoring device 10 to their router/access point. All devices 10 presently disclosed communicate with and may be controlled by a central computer server 40 and the one or more databases 50*a-b* that store the output of monitoring devices 10. The monitoring device 10 may comprise an embedded software/firmware configured to access website locations (URLs) of popular Internet content providers, downloading content from these providers, and measuring the throughput of the download. 75%+ of Internet downloads in the U.S. are from the top ten sites (Netflix alone accounts for greater than 30%). According to some embodiments, the devices 10 may be instructed, at random intervals during the day, to access one or more of these popular URLs to obtain random content. According to some embodiments, the monitoring devices 10 may be programmed to execute these commands all at the same time. According to some embodiments, in the same timeframe, the monitoring devices 10 may also conduct a speed/throughput test to a local server 40 as a control. Throughput may be measured for all tests and sent back to the central server 40. Because users in a given location will have different ISPs, relative throughput can be determined.

According to some embodiments presently disclosed, the method of assessing popular sites are not preformed through a web browser or app that processes webpages for consumer consumption. According to some embodiments, a networking utility is presently disclosed and is used to assess popular sites. The networking utility takes as input a site id representing 1 of 14 of the most popular websites (by download traffic), including Netflix, amazon prime, twitch, hbo, yahoo, vimeo, soundcloud, etc. Because Internet traffic is "bursty" (the transmitter sends a bunch of packets, waits to receive an ack, then sends a bunch more packets, and so on), the networking utility simulates this traffic by requesting a serial stream of a certain programmable number of packets, then waiting for a programmable period of time, and then requesting more packets, and so on (note: some sites send a set number of packets regardless of the request from the end user app).

According to some embodiments, the networking utility performs this test a pre-set number of times. According to some embodiments, the networking utility performs this three times, measuring the rate at which packets are received each time, and then averages the three rates to provide a throughput diagnostic. The networking utility may then autonomously transmits this information to the server 40 through the device 10 and/or router 15.

According to some embodiments, the server 40 comprises logic that compares the average speed received by users who have different ISPs in the same area. The server 40 may be configured to compare this data at the zip code, city or state level, and actually autonomously decides which geographic designation to use based on the number of responses received from devices 10 in that area (the server 40 may try to do smaller areas first but then do larger if there isn't enough data in the smaller area).

According to some embodiments, outside of violations of net neutrality, the networking utility is configured to compare the relative speed of different ISPs. The plan user purchases from an ISP is the max throughput of the connection. In practice, websites don't transmit data anywhere close to the user's max speed. For example, a site transmits data at 10 Mbps to two different ISPs, one will typically be faster than the other. The reason is that the speed that data actually gets to the user depends on the quality of user's ISPs network, how well it handles congestion, how new its equipment is, how large the buffers are at various connection points, etc. According to some embodiments, the networking utility may be configured accomplishes this comparison.

Because the measurements are all conducted in one geography at the exact same time, the expectation is that, 1) the relative throughput of the ISPs should be consistent and/or, 2) the throughput measurements themselves should not vary by a considerable amount. If either of these conditions does not hold true the implication is that the ISP who violates these conditions could be manipulating traffic from the (non-control) site in question and thus violating net neutrality.

Figure 5:
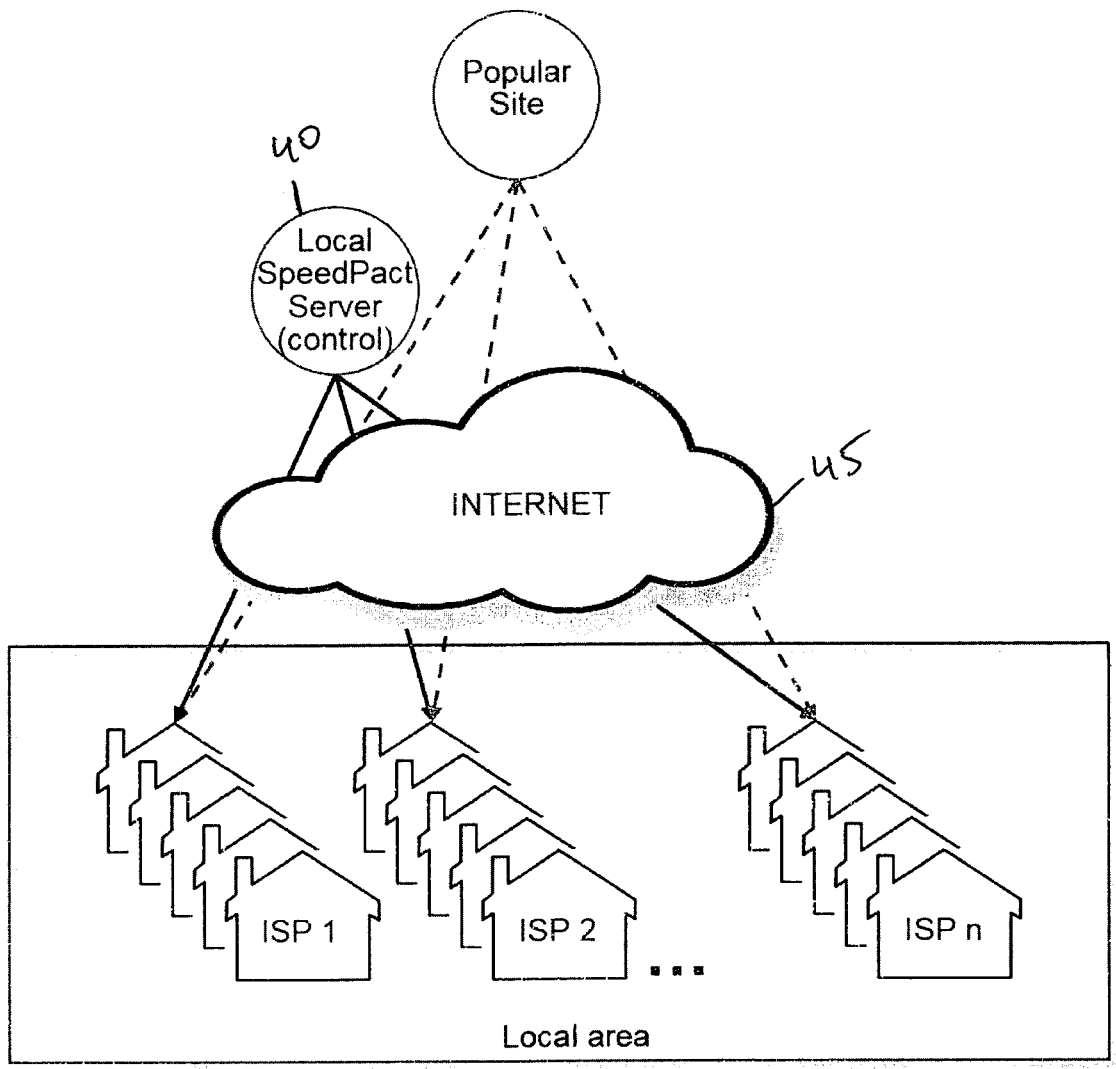
FIG. 5 depicts a system according to the present disclosure.

Referring to FIG. 5, x1, y1, and z1 should be very similar in terms of actual numbers (there may be a small delta because some ISPs networks are slower than others). Additionally, the ratio between x1 to x2, y1 to y2, and z1 to z3 should be very similar. According to some embodiments a presently disclosed, if both conditions are false for a given ISP then there may be a net neutrality violation. According to some embodiments a presently disclosed, if one or both conditions are false for a given ISP then there may be a net neutrality violation.

According to some embodiments a presently disclosed, the reason why both have to be false is because x1, y1, and z1 can be different if the ISP's network is experiencing congestion related issues that are systemic to their owned part of the network (not the external Internet—so the other ISP wouldn't be affected). However if that's the case then the ratio to a non-throttled server should be similarly affected (this condition could be intermittent, but if measurements are taken at multiple times during the day the discrepancy shouldn't persist).

Similarly, x1, y1, z1 can be the same and the ratios be different, but since the throughput to the server 40 should be normally much faster than throughput to a specific site, this is more probably an indication that the ISP in question is experiencing congestion that affects max throughput and again not a violation of net neutrality.

"Net neutrality" is difficult to diagnose because it's specific to an ISP, specific to a site or set of sites, and may be specific to a certain period of time. ISPs are able to get away with manipulating traffic because they're betting that even if a user suspects that ISPs are doing this, user will never be able to prove it.

According to some embodiments, presently disclosed system is configured to perform "net neutrality" test (a test to make sure internet speeds are the same for different websites being viewed by the user) by focusing, for example, on the top 10+ websites in the U.S. (by downloads) because combined they represent most of the downloaded content in North America (Netflix and Youtube alone represent >50%).

Figure 6:
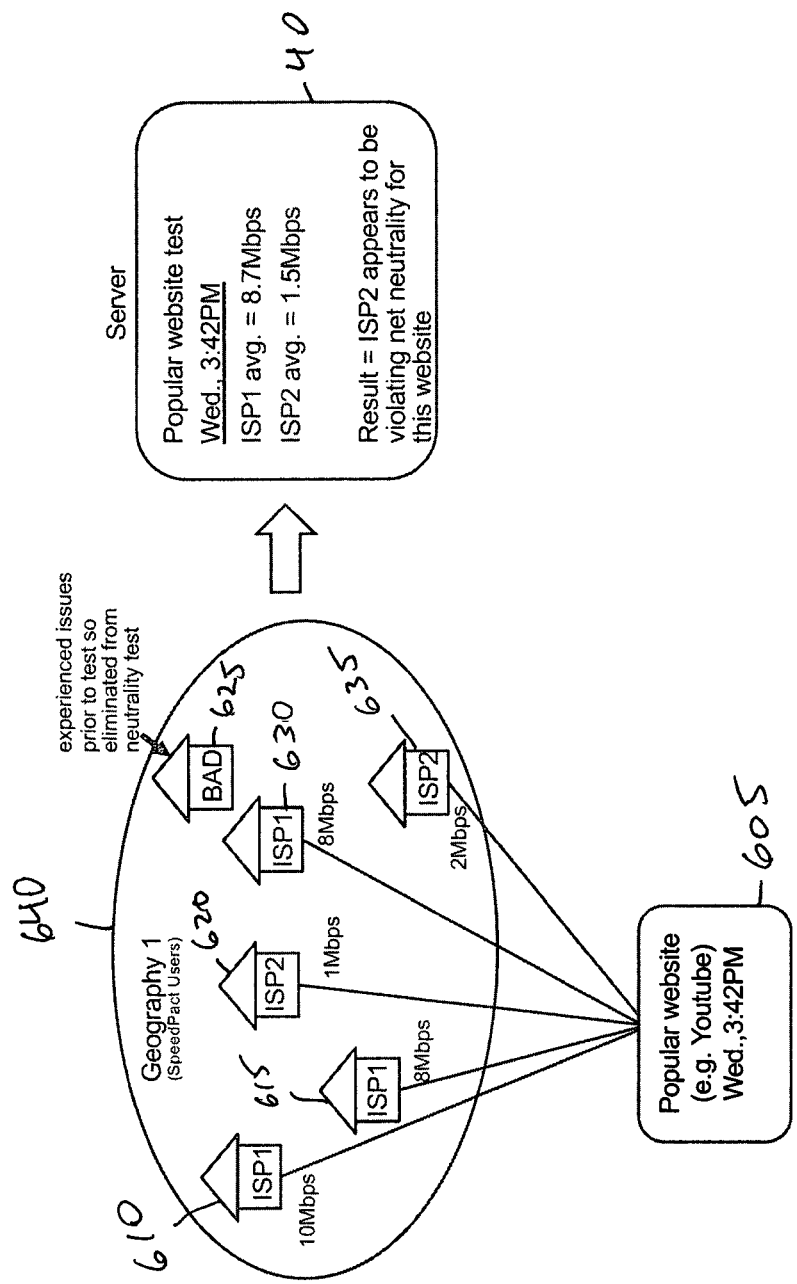
FIG. 6 depicts the system according to the present disclosure.

According to some embodiments, presently disclosed system conducts a direct test-meaning it attempts to directly access the actual servers of the sites under test. According to some embodiments, presently disclosed system is configured to detect net neutrality violations by crowdsourcing—comparing access speeds to popular websites 605 between users 610, 615, 620, 625, 630, 635 of different ISPs in the same general location 640 when conducting simultaneous downloads as shown in FIG. 6. Referring to FIG. 6, users 610, 615 and 630 are using, for example, services of ISP1 and users 620, 635 are using, for example, services of ISP2.

According to some embodiments, readings from users 610, 615, 620, 625, 630, 635 are used as a control to eliminate the affect of ISP issues or systemic issues as the cause for anomalies (i.e. if the reading is bad, it's not because your ISP is crappy to all sites, just the site under test).

Figure 7:
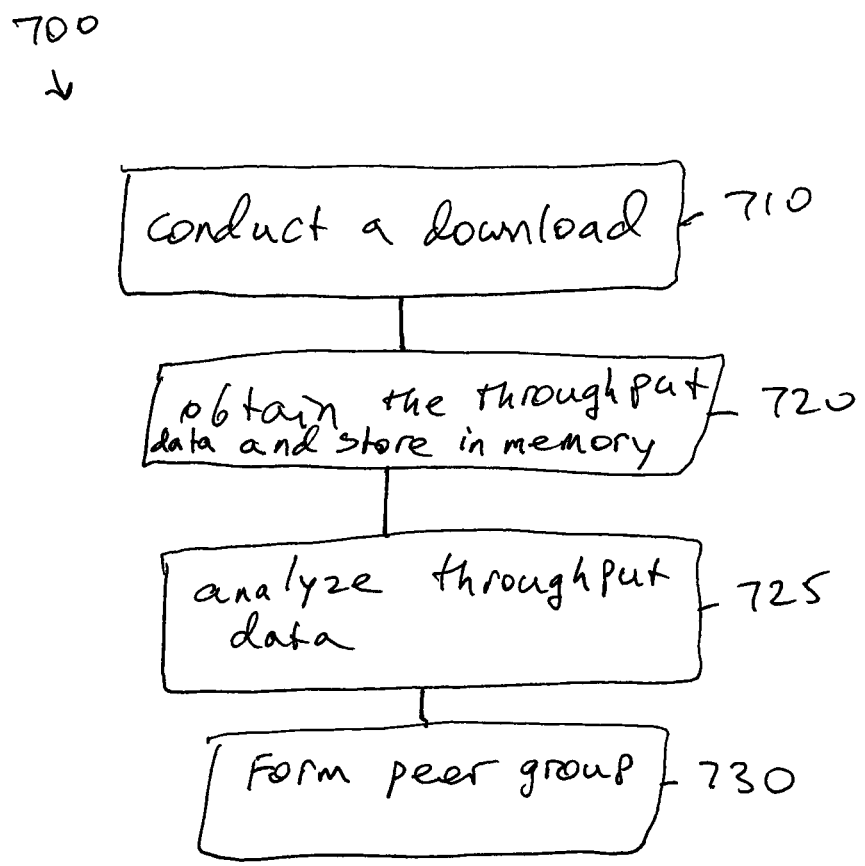
FIG. 7 depicts a method according to the present disclosure.
Figure 8:
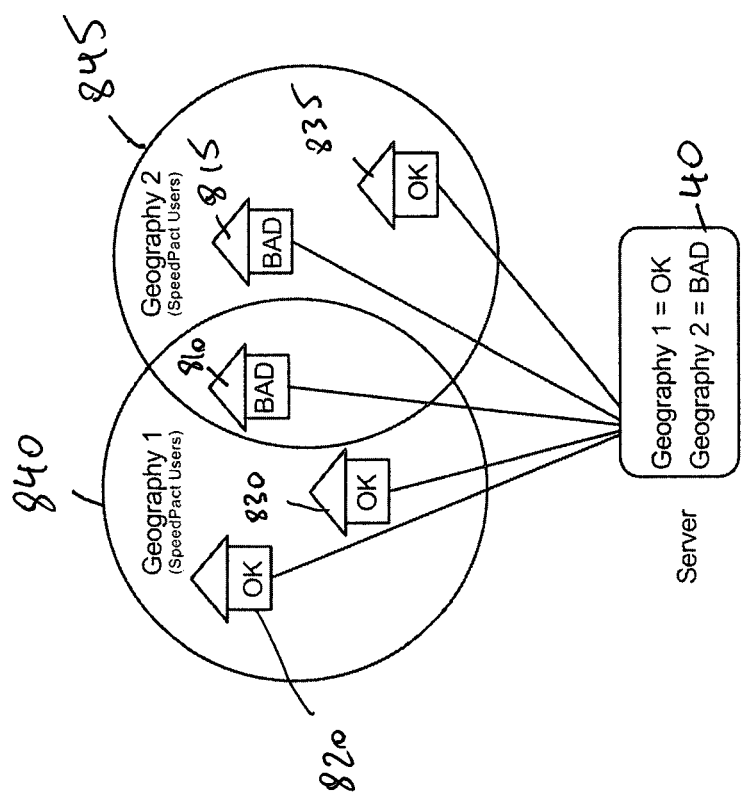
FIG. 8 depicts the system according to the present disclosure.

Referring to FIG. 7, a method 700 of performing a "net neutrality" test is shown according to some embodiments presently disclosed. At 710, the presently disclosed system directs the devices 10 of all users 610, 615, 620, 625, 630, 635 to conduct a download from the servers of a popular site 605 (e.g. Netflix, Youtube) at precisely the same random time. At 720, the devices 10 capture (i.e obtain) the throughput data of these tests and send them to a central database 50a and/or 50b in real-time.

According to some embodiments, once per defined "time period" (generally one day), for each user 610, 615, 620, 625, 630, 635, at 725 the presently disclosed system analyzes all the throughput data from all other users in the same general location 640 (or city or state if too few subscribers are in the users zip code) and at 730 forms a peer group out of the users 610, 615, 620, 625, 630, 635.

According to some embodiments, presently disclosed system identifies the peers within the user's locality 640 who have the fastest plans for their ISP and sets their average access speeds as the "standard". Those users 625 who were experiencing "Issues" during the test times are excluded from the peer group.

If the user 625 of the presently disclosed system was experiencing "Issues" during the test times, or if no other users in the peer group use a different ISP vs. the user, then no test can be conducted and no conclusions drawn. If the user's 610 average access time is within a first preset percentage (for example 2%) of their promised speed then NO net neutrality violation has occurred.

Else, the user 610's access time is compared to the fastest "standard". If the user 610's time is within a second preset percentage (for example 5%) of the "standard", then no net neutrality violation is flagged, otherwise a "net neutrality" violation is flagged.

According to some embodiments, the presently disclosed system uses crowdsourcing to detect connectivity issues experienced by an ISP in a certain geography area 840, 845 (zipcode, city/community, and/or state if there are too few users in the smaller geographic areas).

An "Issue" is defined as speed less than the ISP "promised" for at least 30 minutes out of an hour. When an "Issue" is detected for a specific user 810 and/or 815, the Issue is logged in an Issue Table stored in a database 50a and/or 50b.

It is to be understood that all references to tables (for example Issue table) are references to the database 50a and/or 50b that stores all user/device information to be accessed by the server 40.

According to some embodiments, periodically (nominally, every 15 minutes, but this is programmable), the presently disclosed system checks the Issues table for users 810, 815, 820, 830, 835 in every geography area 840, 845 in the system.

Access Issues table for the time period for all users in the defined area for each ISP. For each ISP, if ratio of total users 810, 815, 835 in the area 845 to users 810, 815 in the area 845 who experienced issues is greater than a predetermined percentage (for example 15%), then the ISP in the area 845 is reported as having a connectivity issue for that defined area According to some embodiments, presently disclosed system send notifications to users 810, 815 when their ISP is experiencing issues.

According to some embodiments, the monitoring device 10 is configured to run a Ping test. The Ping test is a ubiquitous and standardized, open source networking utility that has been implemented by different operating systems.

According to some embodiments, the monitoring device 10 is configured to run speed test using nuttcp. The nuttcp is a standard, open source networking utility. The nuttcp is a network performance measurement tool intended for use by network and system managers. Its most basic usage is to determine the raw TCP (or UDP) network layer throughput by transferring memory buffers from a source system across an interconnecting network to a destination system, either transferring data for a specified time interval, or alternatively transferring a specified number of bytes. In addition to reporting the achieved network throughput in Mbps, the nuttcp also provides additional useful information related to the data transfer such as user, system, and wall-clock time, transmitter and receiver CPU utilization, and loss percentage (for UDP transfers).

There are two basic modes of operation for the nuttcp. The original or classic mode is the transmitter/receiver mode, which is also the way the original ttcp and nttcp worked. In this mode, a receiver is first initiated on the destination host using "nuttcp -r", and then a transmitter must be started on the source host using "nuttcp -t". Second mode of operation for nuttcp is the new client/server mode. With this mode, a server is first started on one system using "nuttcp -S" (or "nuttcp -1"), and then a client may either transmit data to (using "nuttcp -t") or receive data from (using "nuttcp -r") the server system. All the information provided by nuttcp is reported by the client, including the information from the server, thus providing a full snapshot of both the transmitter and receiver ends of the data transfer.

The server may be started by a normal, non-privileged user by issuing either a "nuttcp -S" or a "nuttcp -1" command. However, the optimal and recommended method of running a server is to run "nuttcp -S" via the inetd/xinetd daemon. This method has several significant advantages, including being more robust, allowing multiple simultaneous connections, and providing for access control over who is allowed to use the nuttcp server via the hosts.allow (and hosts.deny) file. By default, the nuttcp server listens for commands on port 5000, and the actual nuttcp data transfers take place on port 5001.

The host parameter must be specified for the transmitter, and provides the host name or IP address of the receiver. In classic transmitter/receiver mode, the host parameter may not be specified for the receiver. In client/server mode, when the client is the receiver, the host parameter specifies the host name or IP address of the transmitter (server).

Normally, a nuttcp data transfer is memory-to-memory. However, by using the "-s" option, it is possible to also perform memory-to-disk, disk-to-memory, and disk-to-disk data transfers. Using the "-s" option with the transmitter will cause nuttcp to read its data from the standard input instead of using a prefabricated memory buffer, while using the "-s" option on the receiver causes nuttcp to write its data to standard output. All these types of data transfers are possible with the classic transmitter/receiver mode. For security reasons, the "-s" option is disabled on the server, so it is not possible to access the disk on the server side of a data transfer.

The allowed options to nuttcp are:
- -h Print out a usage statement. Running nuttcp with no arguments will also produce a usage statement.
- -V Prints the nuttcp version number. The nuttcp version is also printed as part of the normal nuttcp output when the "-v" verbose output is used (but not when using the default brief output). In client/server mode, the version number of both the client and server is identified.
- -t Indicates that this nuttcp is the transmitter. In client/server mode, this means the server specified by the host parameter is the receiver.
- -r Indicates that this nuttcp is the receiver. In client/server mode, this means the server specified by the host parameter is the transmitter.
- -S Indicates that this nuttcp is the server. The only option that may be specified to the server is the "-P" option, which allows one to change the control port used by the server, but only when the server is started by a normal, non-privileged user. When the server is initiated by inetd/xinetd, the server control port should be specified in the services file.
- -1 Basically the same as the "-S" option, but indicates a one-shot server, i.e. the server exits after the first data transfer initiated by a client. The "-1" option should only be used when the server is started by a normal, non-privileged user. This option will probably rarely need to be used, but can be useful for a quick test and eliminates the possibilty of leaving a non-access controlled nuttcp server running on the system (which can happen when using the "-S" option and forgetting to kill the nuttcp server after finishing a series of tests).
- -b Produce brief one-line output, which includes the amount of data transferred in MB (1024**2 bytes), the time interval in seconds, the TCP (or UDP) network throughput in Mbps (millions of bits per second), the transmitter and/or receiver CPU utilization, and for UDP data transfers also outputs the loss percentage. In client/server mode, most of the printed statistics are from the viewpoint of the receiver. This is the default output format.
- -B This option is only valid for the receiver, and forces the receiver to read a full buffer (as specified by the "-1" buffer length option) from the network. It is mainly intended to be used with the "-s" option to only output full buffers to standard output (e.g. for use with tar). It is also implicitly set whenever the number of streams as specified by the "-N" option is greater than 1. This option is not passed to the server.
- -d For TCP data transfers, sets the SO_DEBUG option on the data socket. This option is not passed to the server. It is a rarely used option which may possibly be removed or renamed in a future version of nuttcp.
- -D This option is only valid for the transmitter, and only for TCP data transfers, in which case it sets the TCP_NODELAY option on the data socket, which turns off the Nagle algorithm causing data packets to be sent as soon as possible without introducing any unnecessary delays. This option is not passed to the server. It is a rarely used option which may possibly be removed or renamed in a future version of nuttcp.
- -s Setting the "-s" option causes nuttcp to either read its data from standard input rather than using prefabricated memory buffers (for "nuttcp -t"), or to write its data out to standard output (for "nuttcp -r"). The "-s" option is disabled for security reasons on the server.
- -u Use UDP for the data transfer instead of the default of TCP.
- -v Verbose output that provides some additional information related to the data transfer. In client/server mode, the server is always verbose (implicit "-v" option), but the client controls the extent and type of output via the "-v" and "-b" options.
- -cdscp_value Sets the socket option to support COS. Either takes a dscp value or with the t|T modifier it takes the full TOS field.
- -lbuffer_len Length of the network write/read buffer in bytes for the transmitter/receiver. It defaults to 64 KB (65536) for TCP data transfers and to 8 KB (8192) for UDP. For client/server mode, it sets both the client and server buffer lengths.
- -nnum_bufs Specifies the number of source buffers written to the network (default is unlimited), and is ignored by the receiver. For client/server mode, if the client issues a "nuttcp -r" command making it the receiver, this parameter is passed to the server since the server is the transmitter in this case. This parameter is also ignored if the "-s" parameter is specified to the transmitter.

-wwindow_size Indicates the window size in KB of the transmitter (for "nuttcp -t") or receiver (for "nuttcp -r"). Actually, to be technically correct, it sets the sender or receiver TCP socket buffer size, which then effectively sets the window size. For client/server mode, both the transmitter and receiver window sizes are set. The default window size is architecture and system dependent. Note recent Linux systems, out of a misguided desire to be helpful, double whatever window size is actually specified by the user (this is not a bug with nuttcp but a bug/feature of the Linux kernel). Also, with these Linux systems, the actual window size that's used on the intervening network, as observed with tcpdump, is greater than the requested window size, but less than the doubled value set by Linux.

-wsserver_window For client/server mode, the "-ws" option provides a mechanism for setting a different window size on the server than the client window size as specified with the "-w" option.

-wb Normally, to conserve memory, the transmitter only sets the TCP send socket buffer size and the receiver only sets the TCP receive socket buffer size. However, if the "-wb" option is used, the transmitter will also set the TCP receive socket buffer size and the receiver will also set the TCP send socket buffer size. Under normal circumstances, this should never be necessary. This option was implemented because certain early braindead Solaris 2.8 systems would not properly set the TCP window size unless both the TCP send and receive socket buffer sizes were set (later Solaris 2.8 systems have corrected this deficiency). Thus the 'b' in this option can stand either for "braindead" or "both".

-pdata_port Port number used for the data connection, which defaults to port 5001. If multiple streams are specified with the "-N" option, the "-p" option specifies the starting port number for the data connection. For example, if four streams are specified using the default data connection port number, nuttcp will use ports 5001, 5002, 5003, and 5004 for the four TCP (or UDP) connections used to perform the data transfer.

-Pcontrol_port For client/server mode, specifies the port number used for the control connection between the client and server, and defaults to port 5000. On the server side, the "-P" option should only be used when the server is started manually by the user. If the server is started by inetd/xinetd (the preferred method), the control connection must be specified by adding a nuttcp entry to the services file.

-Nnum_streams Species the number of parallel TCP (or UDP) data streams to be used for the data transfer, with the default being a single data stream. The maximum number of parallel data streams that can be used is 128. If the number of streams is greater than one, the "-B" option is implicitly set. The current implementation does not fork off separate processes for each data stream, so specifying multiple streams on an SMP machine will not take advantage of its multiple processors. Of course it is always possible to run multiple nuttcp commands in parallel on an SMP system to determine if there is any advantage to running on multiple processors. This is especially simple to do when running in client/server mode when the server is started from the inetd/xinetd daemon. When running multiple nuttcp commands in parallel, the "-T" transmitter timeout option may be used to insure that all the nuttcp commands finish at approximately the same time.

-Rxmit_rate_limit[m|g] The transmitter rate limit throttles the speed at which the transmitter sends data to the network, and by default is in Kbps, although the 'm' or 'g' suffix may be used to specify Mbps or Gbps. This option may be used with either TCP or UDP data streams. Because of the way this option is currently implemented, it will consume all the available CPU on the transmitter side of the connection so the "% TX" stats are not meaningful when using the rate limit option. By default the rate limit is applied to the average rate of the data transfer in real time, and not in CPU time, so if nuttcp is switched out of the processor for any reason, when it is switched back in, it is possible that the instantaneous rate may momentarily exceed the specified value. There is an 'i' qualifier to the rate limit option (specified as "-Ri") that will restrict the instantaneous rate at any given point in time to the specified value, although in this case the final rate reported by nuttcp may be less than the specified value since nuttcp won't attempt to catch up if other processes gain control of the CPU. The default is no rate limit. Note another way to throttle the throughput of TCP data streams is to reduce the window size.

-Txmit_time limit[m] Limits the amount of time that the transmitter will send data to the specified number of seconds, or number of minutes if the 'm' suffix is used. Normally a data transfer will either specify a fixed amount of data to send using the "-n" option, or a fixed period of time to send using the "-T" option. However, if both the "-n" and "-T" options are used, the data transfer will be stopped by whichever option takes affect first. The default is a 10 second time limit for the data transfer.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A system for testing broadband internet connectivity comprising:
   a first monitoring device electrically connected with a first router;
   at least one remote server configured to communicate with the first monitoring device through the first router; and
   a second monitoring device electrically connected with a second router, wherein the second monitoring device is configured to communicate with the at least one remote server through the second router;
   wherein the first monitoring device is configured to run one or more tests to determine a first set of parameters of the internet connection between the first monitoring device and the at least one remote server;

wherein the second monitoring device is configured to run one or more tests to determine a second set of parameters of the internet connection between the second monitoring device and the at least one remote server;

wherein the system for testing broadband internet connectivity performs net neutrality test based on the first set of parameters and the second set of parameters.

2. The system for testing broadband internet connectivity of claim 1, wherein the system for testing broadband internet connectivity determines internet connection up-time based on the first set of parameters and the second set of parameters.

3. The system for testing broadband internet connectivity of claim 1, wherein the system for testing broadband internet connectivity determines internet connection speed based on the first set of parameters and the second set of parameters.

4. The system for testing broadband internet connectivity of claim 1, wherein the system for testing broadband internet connectivity determines internet downtime based on the first set of parameters and the second set of parameters.

5. The system for testing broadband internet connectivity of claim 1, wherein the first monitoring device is inside the router.

6. The system for testing broadband internet connectivity of claim 1, wherein the first monitoring device is a stand-alone device.

7. The system for testing broadband internet connectivity of claim 1, wherein the first monitoring device is embedded in another electronic device.

8. The system for testing broadband internet connectivity of claim 1, wherein the one or more tests are a speed test or a ping test.

9. The system for testing broadband internet connectivity of claim 1, wherein the system for testing broadband internet connectivity generates Internet Service Provider statistics based on the first set parameters; wherein Internet Service Provider statistics includes internet connection up-time.

10. The system for testing broadband internet connectivity of claim 1, wherein the system for testing broadband internet connectivity generates Internet Service Provider statistics based on the first set parameters; wherein Internet Service Provider statistics includes internet connection speed.

11. The system for testing broadband internet connectivity of claim 1, wherein the system for testing broadband internet connectivity generates Internet Service Provider statistics based on the first set parameters; wherein Internet Service Provider statistics includes internet connection value.

* * * * *